United States Patent
Bischof

(10) Patent No.: US 9,938,982 B1
(45) Date of Patent: Apr. 10, 2018

(54) TURBOCHARGER THRUST BEARING AND MANUFACTURING METHOD

(71) Applicant: BorgWarner Inc., Auburn Hills, MI (US)

(72) Inventor: Kenneth Bischof, Adren, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/340,964

(22) Filed: Nov. 1, 2016

Related U.S. Application Data

(63) Continuation of application No. 15/275,392, filed on Sep. 24, 2016.

(51) Int. Cl.
| | | |
|---|---|---|
| *F16C 33/10* | (2006.01) | |
| *F01D 25/16* | (2006.01) | |
| *F04D 29/051* | (2006.01) | |
| *F04D 29/053* | (2006.01) | |
| *F04D 29/056* | (2006.01) | |
| *F16C 17/04* | (2006.01) | |
| *F16C 33/14* | (2006.01) | |

(52) U.S. Cl.
CPC .......... *F04D 29/051* (2013.01); *F01D 25/16* (2013.01); *F04D 29/053* (2013.01); *F04D 29/056* (2013.01); *F16C 17/047* (2013.01); *F16C 33/14* (2013.01); *F05D 2220/40* (2013.01); *F05D 2230/10* (2013.01); *F05D 2240/52* (2013.01); *F05D 2240/60* (2013.01); *F16C 2220/60* (2013.01); *F16C 2360/24* (2013.01)

(58) Field of Classification Search
CPC .... F16C 33/1075; F16C 17/047; F16C 33/14; F16C 2360/24; F16C 2220/60; F01D 25/168; F04D 29/051; F04D 29/053; F04D 29/056; F05D 2220/40; F05D 2240/52; F05D 2240/60; F05D 2230/10
See application file for complete search history.

(56) References Cited

U.S. PATENT DOCUMENTS

| | | | | |
|---|---|---|---|---|
| 3,370,897 A | * | 2/1968 | Rylatt | F16C 17/04 384/368 |
| 4,747,705 A | | 5/1988 | Agrawal | |
| 5,829,338 A | * | 11/1998 | Chrestoff | F04B 1/148 384/121 |
| 6,024,495 A | * | 2/2000 | Loos | F01D 25/168 384/123 |
| 6,935,849 B2 | | 8/2005 | Gutknecht | |
| 6,976,788 B2 | * | 12/2005 | Honda | F16C 17/047 384/123 |
| 7,470,064 B2 | * | 12/2008 | Link | F01D 25/168 384/121 |

(Continued)

FOREIGN PATENT DOCUMENTS

| | | | |
|---|---|---|---|
| JP | 2004293684 A | * | 10/2004 |
| WO | WO2009/015338 | | 1/2009 |

OTHER PUBLICATIONS

Machine Translation of JP 2004293684 dated Oct. 2004.*

*Primary Examiner* — Alan B Waits

(57) ABSTRACT

A thrust bearing, particularly for a turbocharger, having unique configurations on the thrust pad faces, including free-form curvatures or non-linear configurations defined by a geometric equation. The thrust pad faces can be configured by a programmed linear actuator system and cutting tool.

2 Claims, 6 Drawing Sheets

(56) References Cited

U.S. PATENT DOCUMENTS

| | | | |
|---|---|---|---|
| 8,021,105 B2 * | 9/2011 | Ammann | F01D 25/168 |
| | | | 384/123 |
| 8,764,377 B2 * | 7/2014 | Frankenstein | F01D 25/168 |
| | | | 415/104 |
| 9,447,819 B2 * | 9/2016 | Dehne | F16C 17/18 |

* cited by examiner

TURBOCHARGER THRUST BEARING AND MANUFACTURING METHOD

CROSS-REFERENCE TO RELATED APPLICATION

This application is a continuation of U.S. application Ser. No. 15/275,392 filed Sep. 24, 2016, which is incorporated herein by reference in its entirety.

TECHNICAL FIELD

The present invention relates to thrust bearings, particularly for turbochargers, and to methods of manufacturing thrust bearings.

BACKGROUND OF THE INVENTION

Thrust bearings are a particular type of rotary-element bearings and are designed to support axial loads. Thrust bearings are commonly used in automotive, marine, power generation and aerospace applications. One common use is in turbochargers, particularly for passenger and commercial vehicles.

Turbochargers are used to increase engine power output by providing higher charge-air density such that more fuel can be burned in each engine cycle. The use of turbochargers permits use of smaller engines and still maintain similar power and performance as larger engines. This also leads to the design and production of smaller and lighter vehicles, with resultant savings in weight and increased fuel economy.

One type of thrust bearings which are utilized in turbochargers are fixed profile fluid-film thrust bearings which provide increased bearing life and reduced cost. Thrust bearings contain a plurality of thrust pads arranged on one or both sides of the thrust bearing disc, and have central openings for placement on or around a shaft. These thrust bearings create regions of oil between the thrust pads and rotating disc members, such as collar washers, which support the applied thrust and eliminate metal-on-metal contact.

Current methods of manufacturing the thrust pads for fluid-film thrust bearings are expensive with lengthy cycle times, or are manufactured by stamping which often creates tolerance issues with pad geometry often leading to additional effort and costly redesign.

It is an object of the present invention to provide improved fixed profile fluid-film thrust bearings. It is another object to provide improved thrust pads for fluid-film thrust bearings. It is still another object of the present invention to provide improved methods of manufacture of thrust bearings, particularly relative to the formation of thrust pads for thrust bearings.

SUMMARY OF THE INVENTION

These and other objects are obtained from the present invention, as well as additional cost and performance benefits. The fluid-film thrust bearings and thrust pads can be manufactured with more precision in shape and geometry, as well as reduced manufacture cycling time. Associated benefits include increased load capacity and/or reduced bearing size and reduced oil film losses.

The thrust bearings have a plurality of thrust pads on one or both sides of the thrust bearing disc. The thrust pads are preferably wedge-shaped with adjacent oil grooves and reservoirs. The outer surfaces of the thrust pads are profiled with non-linear geometric or free formed configurations. The profiles have single or compound shapes, with or without a flat land portion. The free-formed profiles can be defined by power law equations.

The thrust pads are machined to their final profile and configuration using a high frequency high load capacity linear actuator machining assembly. Geometric or free-formed shape configuring thrust pads are formed by dimensionally varying radial and axial trajectories of a cutting tool on the actuator assembly. Once the thrust bearing disc is created with oversized thrust pads, the disc is rotated by a controller synchronized motion relative to the linear actuated cutting tool. The cutting tool tip trajectory generates the desired final profiles for the thrust pads.

Other features, benefits and advantages of the present invention will become apparent from the following written description of the invention, in combination with the attached drawings and appended claims.

DESCRIPTION OF PREFERRED EMBODIMENTS

Turbochargers have three main components, a turbine, a compressor and a center housing/hub assembly. The center hub rotating assembly houses the shaft that connects the compressor impeller and turbine. The assembly includes a bearing system to suspend the shaft, allowing it to rotate at high speeds with minimal friction. Turbocharger shafts and turbine wheel assemblies can rotate in excess of 300,000 rpm. In automotive applications, bearing systems typically include a thrust bearing lubricated by a constant supply of pressurized engine oil. These bearings are commonly called fluid-film bearings.

Methods for manufacturing the pads for thrust bearings today are typically expensive and time consuming. This reduces cycle times and increases manufacturing costs. Other known methods produce the thrust bearings and pads by a stamping process. Although this method is less expensive and faster, it often creates pads which have unsatisfactory tolerances and geometries, often leading to reduced life, poorer performances, and increased oil loss.

It is also to be understood that although the present invention is being shown and described with respect to thrust bearings for turbochargers, the invention can be utilized with thrust bearings used for many other products and systems, such as heavy machinery.

Figure 1:
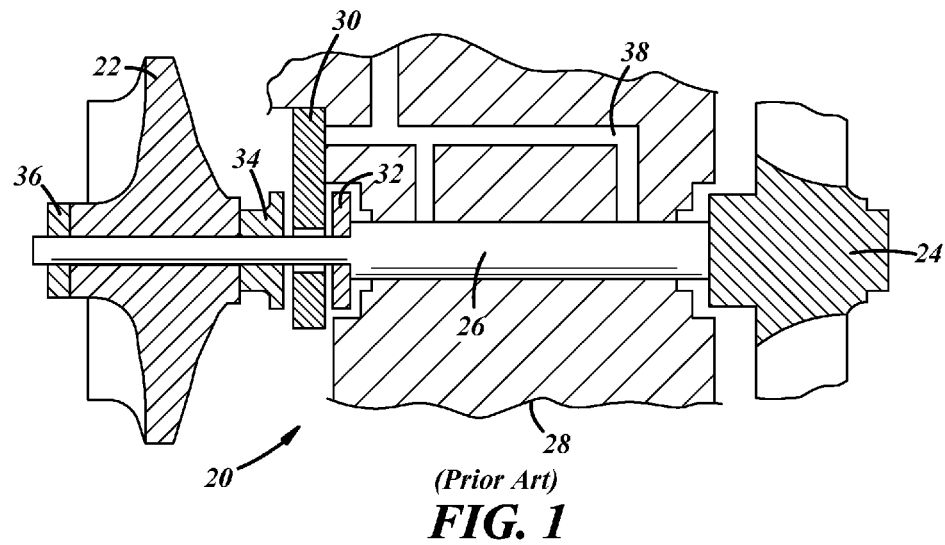
FIG. 1 is a schematic depiction of a turbocharger.

FIG. 1 is a schematic illustration of a generic representative turbocharger 20. The turbocharger includes a compressor wheel 22, a turbine wheel 24, a rotating shaft member 26 and a housing member 28. Other components include a thrust bearing 30, a thrust ring washer (also called a collar disc) 32, a flinger ring or sleeve 34 and a compressor nut 36. The compressor wheel and turbine wheel are connected to the shaft member 26. The thrust bearing 30 is attached to the housing and does not rotate. The thrust ring washer 32 and flinger ring sleeve 34 are attached to the shaft member and rotate with it. The compressor nut 36 is screwed onto the end of the shaft member 26 and compresses together the compressor wheel 22, the flinger ring 34 and the ring washer 32. Other bearings (not shown) are used to facilitate rotation of the shaft member inside the housing, and often other bushings, such as radial bushings, or bearings, are utilized in combination with the thrust bearing.

The thrust bearing pads extend axially, i.e. parallel to the axis of the shaft and rotating collar, and have thrust pad surfaces (also called faces) that are perpendicular to the axis of the shaft. The rotating collar is also called a washer and has flat sides or surfaces that act on the fluid-film between it and the thrust bearing pads.

The flinger sleeve also has a flat face that acts on the fluid film between it and any thrust bearing pads on the adjacent side of the thrust bearing disc.

Passages 38 are provided or machined into the bearing housing to pass oil to the shaft member 26 and thrust bearing 30. The oil is used to lubricate these components, as well as to cool and maintain the components within desired operation temperature limits. The oil is distributed from the main oil feed system of the vehicle in which the turbocharger is located. The films of oil in the bearing reduce friction and extend the life of the bearing and the turbocharger.

Thrust bearings contain a plurality of thrust pads, generally arranged in a circular orientation around the shaft. The size and shape of thrust pads and the number of pads can vary depending on the loads in which the bearing will be subjected. Typically, the bearing pads form a 360° circular pattern, although bearings subjected to lighter load may not extend completely around the shaft.

The thrust bearings are preferably made of a brass or bronze material.

Figure 2:
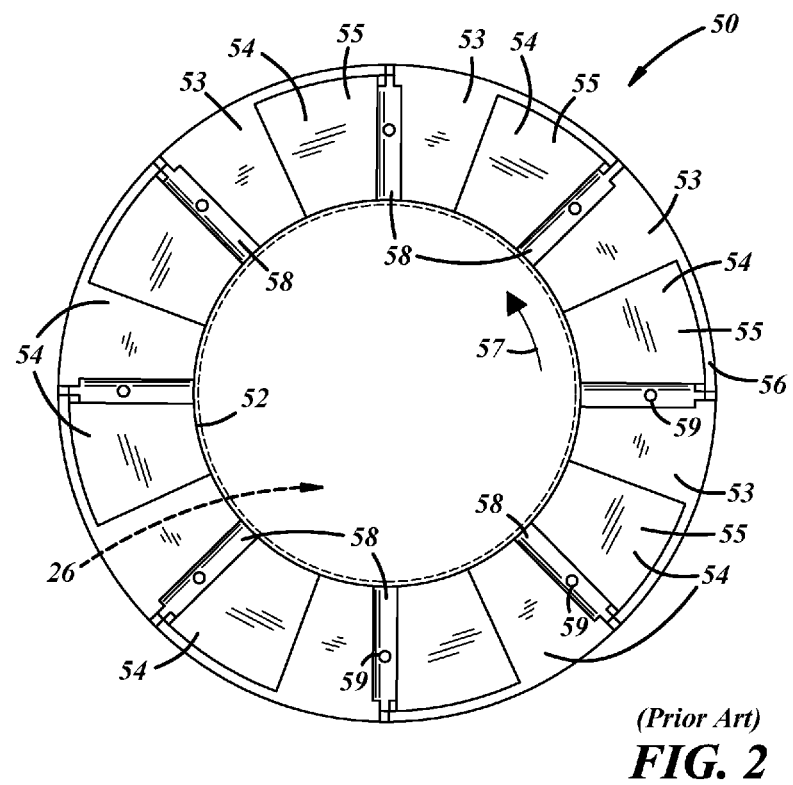
FIGS. 2 and 3 depict known thrust bearings.

Representative thrust bearings are shown in FIGS. 2-5. As shown in FIG. 2, the thrust bearing 50 is circular in shape with a central shaft opening 52 and a plurality of individual thrust pad members 54. The outer surfaces of each of the pad members have land portions 53 and tapered portions 55. A shaft member 26 (shown in dashed lines) is positioned in opening 52 and rotates in the direction of arrow 57. The clearance between the outer diameter of the shaft member 26 and inner diameter of opening 52 is enlarged for ease of illustration. The actual clearance is typically a few millimeters.

A plurality of oil grooves 58 are positioned on the thrust bearings, with a groove positioned between each of the thrust pads 54. Openings 59 are positioned in each of the oil grooves to facilitate the entry and circulation of oil. The outer edge or rim 56 of the thrust bearing is called a shroud or dam. Depending on the design intent, some thrust bearings may not have this feature.

Figure 3:
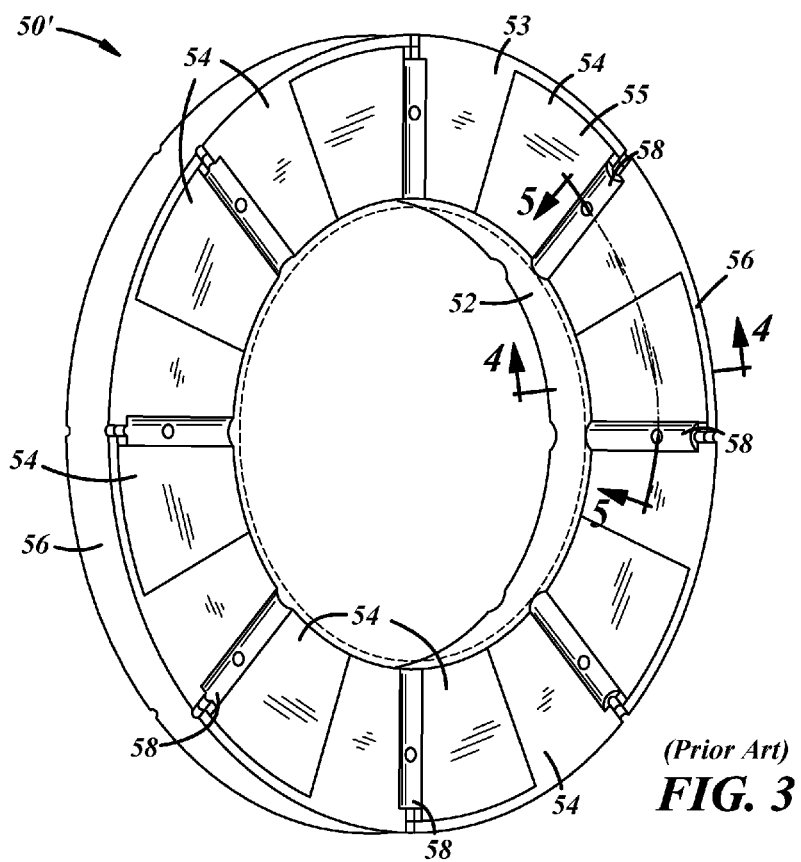

In addition, although the thrust pads depicted in FIGS. 2 and 3 have a sector or wedge shape, this is not critical. Thrust pads used in thrust bearings can have a wide variety of shapes, such as circular, triangular, oval, segmented, or rectangular. Thrust pads with the largest footprint or area are preferred, regardless of their shape.

When thrust bearings are utilized in turbomachines in general, a pair of them can be positioned adjacent a thick rotating thrust collar ring (washer). Thus, thrust pads can be located on both sides of the washer. In other turbomachinery, a pair of thrust washers can be positioned on both sides of a thrust bearing which has thrust pads on both sides.

Figure 4:
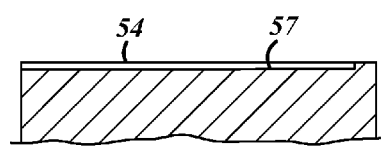
FIGS. 4 and 5 are cross-sections taken along lines 4-4 and 5-5, respectively, in FIG. 3.
Figure 5:
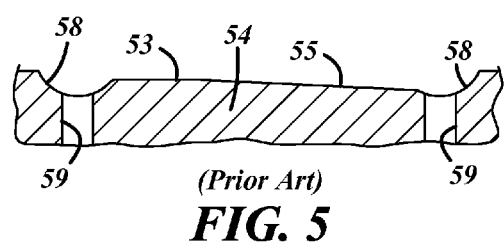

FIGS. 4 and 5 are cross-sections taken along lines 4-4 and 5-5 in FIG. 3. These show that the thrust pads are formed or machined as part of the thrust bearing, i.e. they are not separate components or parts made elsewhere and attached to the thrust bearing disc, but instead are an integral part of a one-piece product.

Figure 6:
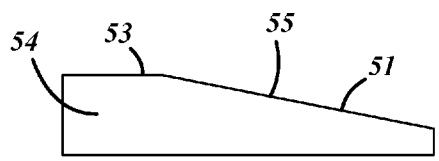
FIGS. 6-10 depict known configurations for thrust pad faces.
Figure 7:
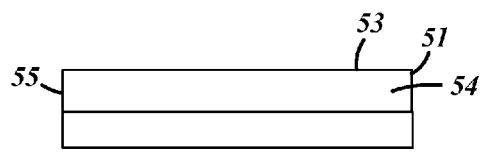

The profile or configuration of the axial outer surface of the thrust pads in known fluid-film thrust bearings typically have from one or more linear tapers. This is shown in FIGS. 3 and 4, as well as FIG. 6, which is a side view of the thrust pads in FIGS. 3 and 4, and in FIG. 7, which is an end view of that thrust pad. The thrust pad 54 has a linear land or flat section 53 and a linear flat tapered section 55. The ratio of the circumferential length of the land section relative to the tapered section is typically about 20% to 80%, but other ratios can be utilized.

Figure 8:
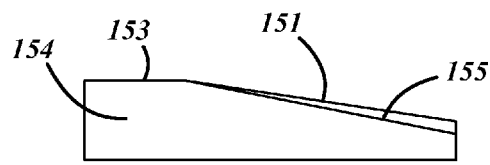
Figure 9:
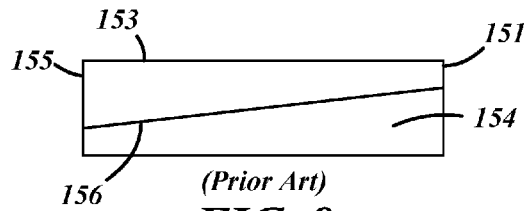

A profile or shape of the axial outer edge 151 of the thrust pad 154 of another known fluid-film thrust bearing is shown in FIGS. 8 and 9. In this instance, the axial outer surface has a compound taper shape. The land or flat section 153 is the same as that of land or flat section 53 in FIGS. 6 and 7, although the tapered section 155 has linear tapers in both the circumferential direction 151 and 155 and in the side radial cross direction 156.

Figure 10:
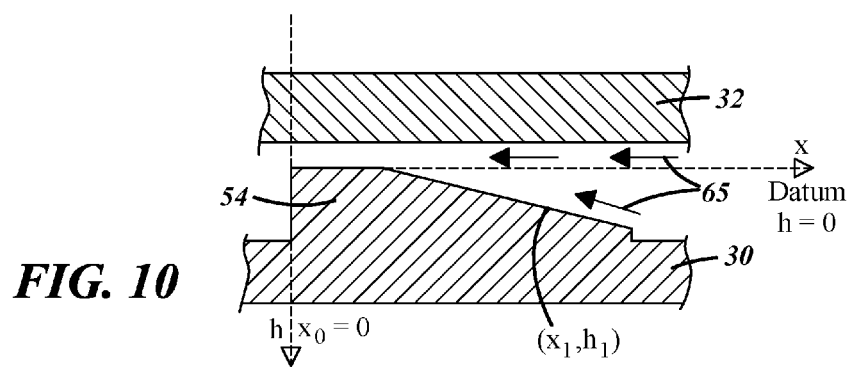

The tapered sections of the thrust pads are oriented relative to the spinning (rotating) thrust collar (washer) such that the oil flow proceeds "up" the tapered ramp. This is shown in FIG. 10. The oil flow is shown by arrows 65 relative to the thrust rotating collar 32 and the stationary thrush bearing 30. (FIG. 10 also shows other items which are referred to below.)

As indicated, thrust bearings can have thrust pads on one or both sides of the disc. The thrust pads preferably will have the same locations, orientations, sizes and shapes on both sides of two-sided thrust bearings, but this can be changed at the discretion of the skilled engineer. For example, the pads and oil grooves could be staggered from one side to the other side. Typically, the oil grooves and reservoirs will be the same and located in the same positions on both sides of a double-sided thrust bearing.

Figure 11:
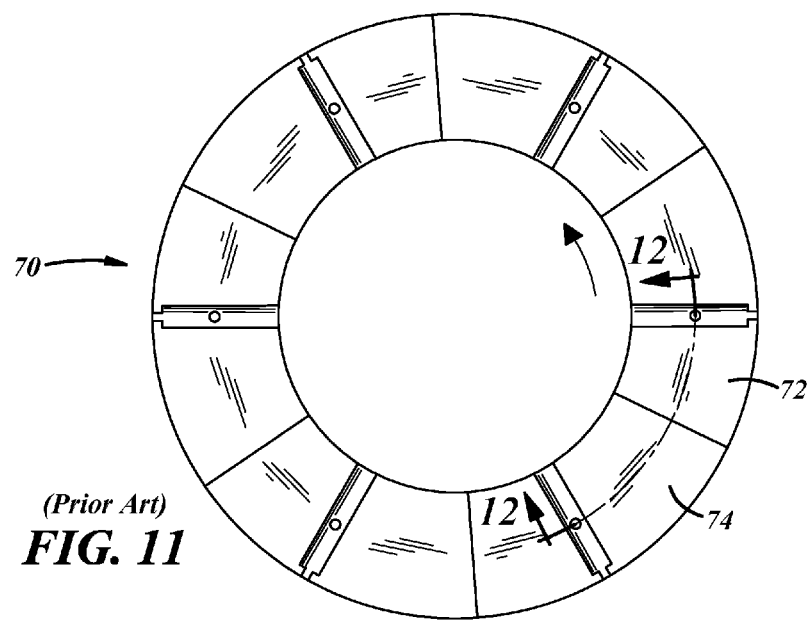
FIGS. 11 and 12 depict another known thrust bearing.
Figure 12:
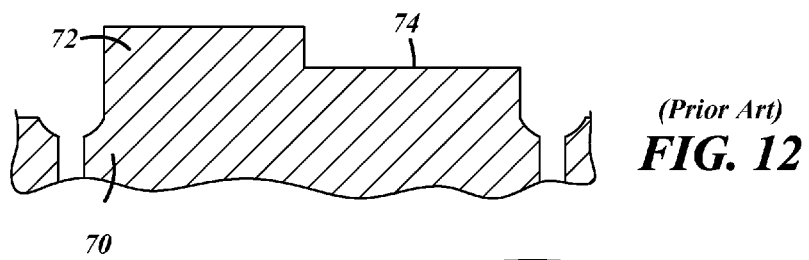

Another known thrust bearing 70 is shown in FIG. 11. In this product, the thrust pads 72 each have a stepped profile 74, as shown in FIG. 12.

Figure 13:
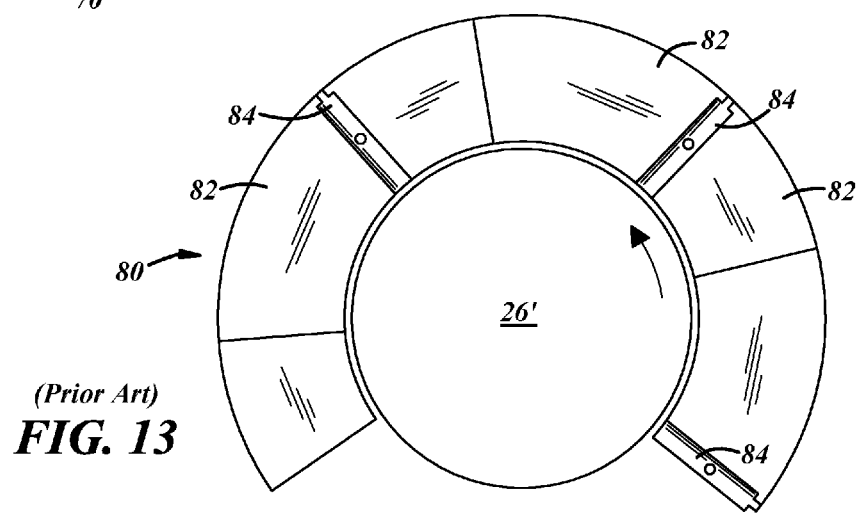
FIG. 13 depicts an additional type of known thrust bearing.

A still further known thrust bearing 80 is shown in FIG. 13. In this thrust bearing 80, the disc body surrounds only a portion of the shaft member 26'. It also has fewer thrust pads 82 and fewer oil grooves 84. This type of thrust bearing 80 is used in situations where the axial faces are less than would be encountered with some turbochargers that need a full 360° thrust bushing. A typical thrust bearing of this type has a 230° shape.

Preferably, the thrust pads are centered around the shaft or at least in a pitch circle configuration centered around the shaft. The remaining portion of the thrust bearing acts as the support structure and typically only needs connection to the bearing housing at the top and sides. The bottom portion of the bearing housing at the bottom of the thrust bearing is left open for oil drainage.

With the present invention, the profile of the axial extension of the thrust pad or thrust pad face, which is the active portion of the thrust pad, on the thrust bearings can have significantly different profiles and shapes. Rather than having a flat surface, or a surface having a land and either a single or compound linear taper, the thrust pads have nonlinear geometrically shaped or free-form shaped curved tapers. The surfaces have varying radial and axial shapes, preferably compound formed shapes. For optimum effectiveness, the precise curve for the surfaces of the thrust pad is determined based on which creates the best flow of oil on its surface.

The profiles of free-formed axial outer surfaces of the thrust pads can have shapes defined by a power law equation. That equation is $h=a(x)^k$, where "$h_1$" is the height at a location "$x_1$" (as shown in FIG. 10), "a" is a constant, "x" is a point location on the thrust pad surface, and "k" is a power. Preferable exponent "k" ranges from 2 to 6 ($x^1$ would be linear) for increased pressure. The selection of the value for "k" depends on the application, such as the speed and load for which the turbocharger is designed. In addition, the "k" exponent used from the leading edge of the taper on the thrust pad to the trailing edge is optimized differently from the exponent to be used for the inside diameter edge to the outer diameter edge of the thrust pad in the case of compound non-linear tapers. As the exponent increases (e.g. "k"=9), the active surface face of the thrust pad approaches a step-pad profile with some abruptness to oil flow.

As shown in FIG. 10, dotted lines where "h"=0 and "x"=0 are depicted, representing the location where the theoretical minimum film thickness would occur between the thrust pad surface and the washer collar. This is shown by the positive directions as indicated by the axis arrows at the end of the dotted lines. When the thrust bearing is initially machined after being formed, a thin layer or stock of material is left on the surface of thrust pad, as explained below. That stock is then machined away to form the final profile shape of the thrust pad surface.

Figure 14:
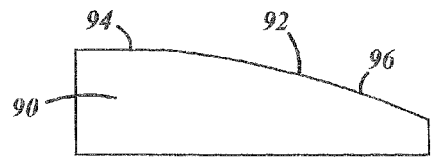
FIGS. 14-19 depict configurations for thrust pad faces for thrust bearings in accordance with the present invention.
Figure 15:
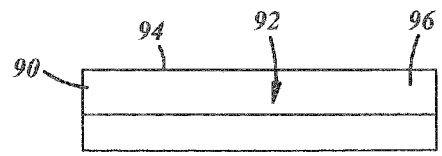

FIGS. 14 and 15 depict a thrust pad 90 in accordance with the invention with an axial outer surface 92 having a flat land section 94 and a non-linear geometric curved taper section 96. Again, the flat land section is at the trailing edge of the thrust pad while the lowest end of the thrust pad is at the leading edge.

The term "geometrically curved" means that the profile or configuration follows a geometric equation and does not have a flat or linear shape.

Figure 16:
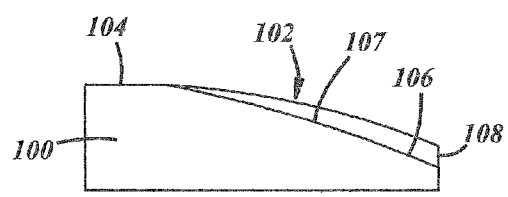
Figure 17:
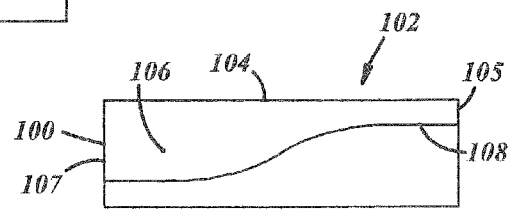
Figure 18:
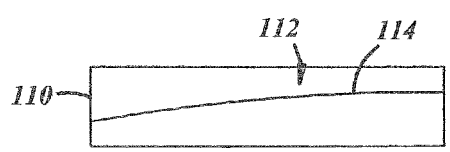

FIGS. 16 and 17 depict a thrust pad 100 in accordance with the invention with a compound curved axial outer face surface 102 on the thrust pad. The thrust pad has a flat land 104 and a geometrically non-linear curved tapered surface 106 which, from the leading edge view FIG. 17 has a compound geometric curve. The nonlinear taper 107 is not the same as the 105 outer diameter. At inner diameter 107, nonlinear taper 108 is transitioning from 107 to 105. FIG. 18 depicts a leading edge view from an alternate thrust pad 110 with an alternate compound tapered shape or curve. The axial outer shape 112 has a different geometric shape or curve 114.

Figure 19:
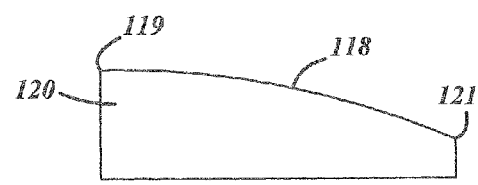

As shown in FIG. 19, it is also possible in accordance with the invention to have the geometric curve 118 begin at the trailing edge 119 of the thrust pad 120 and continuously curve longitudinally from one end to the other end 121, thus eliminating a land or flat section entirely. The curve of the tapered outer surface could be either a single curved taper or a compounded curved taper, either similar to or different from any of the above described compounded geometrically curved profiles.

The term "free form" means that the curvatures and tapers provided on the axial outer surface of the thrust pads cannot be expressed in a geometric equation. They are not equation based.

In accordance with another aspect of the present invention, a unique process is provided relative to manufacturing the thrust bearings and for providing the curvature and/or configuration of the axial outer surfaces on the thrust pads. In particular, the process can be utilized for forming free form or power equation based configurations on the thrust pad surfaces.

Figure 20:
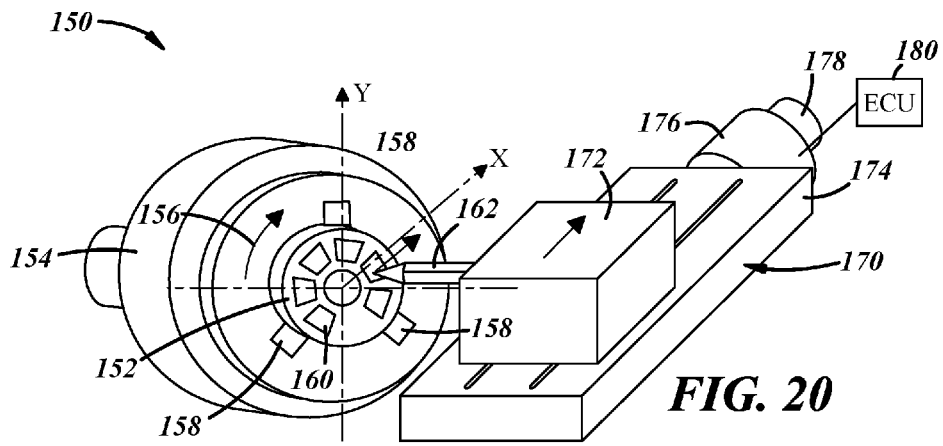

A schematic depiction of an embodiment of the new process and system is depicted in FIG. 20 and identified generally by the reference numeral 150. The process allows for free-forming shape configured thrust pads formed by dimensionally varying radial and axial trajectories of a cutting tool on an actuator device relative to a rotating thrust bearing. The thrust bearing 152 is held in place in a chuck or fixture member 154 which is rotating, such as in the direction of arrow 156. The thrust bearing is held in place by the jaws 158 of the fixture. The upper outer axial surfaces of the thrust pads 160 are not finish machined and a thin layer or stock of excess material 161 is left on them.

A cutting tool 162 is coupled to a linear actuator mechanism 170. The mechanism 170 includes a high frequency linear actuator member 172 that is coupled to a linear-slide member 174 such that the actuator member 172 is moveable along an axis parallel with respect to the outer surface (or faces) of the thrust pads 160 on the thrust bearing 152. A linear slide motor 176 activates the liner slide member 174. A linear position encoder 178 is used to position and move the slide and cutting tool appropriately.

An electronic controller unit (ECU) 180 directs the linear actuator to allow the cutting tool to machine the thin layer of material remaining on the outer surface of the thrust pads and provide the final desired profile and face configuration. This can provide a free-form or any other linear or non-linear geometric configuration on the faces of the thrust pads.

The process provides a synchronized motion of the spinning workpiece relative to the linear activated cutting tool while using cutting tool trajectory to generate the desired configuration. The direction provided by the controller is determined by a user's selection of a particular thrust pad profile chosen from a data base of thrust pad profiles. With this process, machining time for configuring the faces of the thrust pads can be reduced, and the performance of the thrust bearings will be improved.

The process allows the thrust bearing pad geometry to be manufactured faster and with higher precision than prior processes. It also allows increased bearing load capacity and/or reduced bearing size due to the power equation or "free-form" profile. The profile also will reduce oil filling losses by eliminating over-designed thrust bearings.

Figure 21:
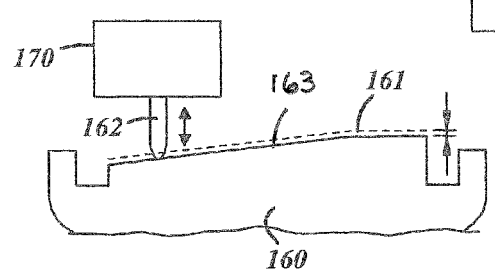
FIGS. 20-21 schematically depict an embodiment of an inventive process for forming configurations and profiles on thrust pad faces.

FIG. 21 schematically depicts the positioning and movement of the cutting tool 162 on a thrust pad 160 by the linear actuator 170. The cutting tool has numerous movements in machining the thrust pads, such as providing the depth of the cut, the radial position of the tool, the angular position for each pass of the tool for each radius of the thrust pads as the thrust bearing rotates. This provides free-form shapes (i.e., free form configurations) 163 at low cycle times with high precision. This is possible since the actuator is software programmable by populating a look-up table that the high frequency actuator uses to determine the depth of cut for each specific location of the thrust pad(s). The process can economically generate linear and curved (nonlinear) pad surfaces to optimize oil flow, load capacity and losses.

The process is also preferably a closed-loop process which profiles trajectories of the thrust pad surface and makes self-corrections and thus reduced errors. Sensors are provided to measure and profile the geometry in real-time and, with feedback, correct any profile trajectory errors.

Figure 22:
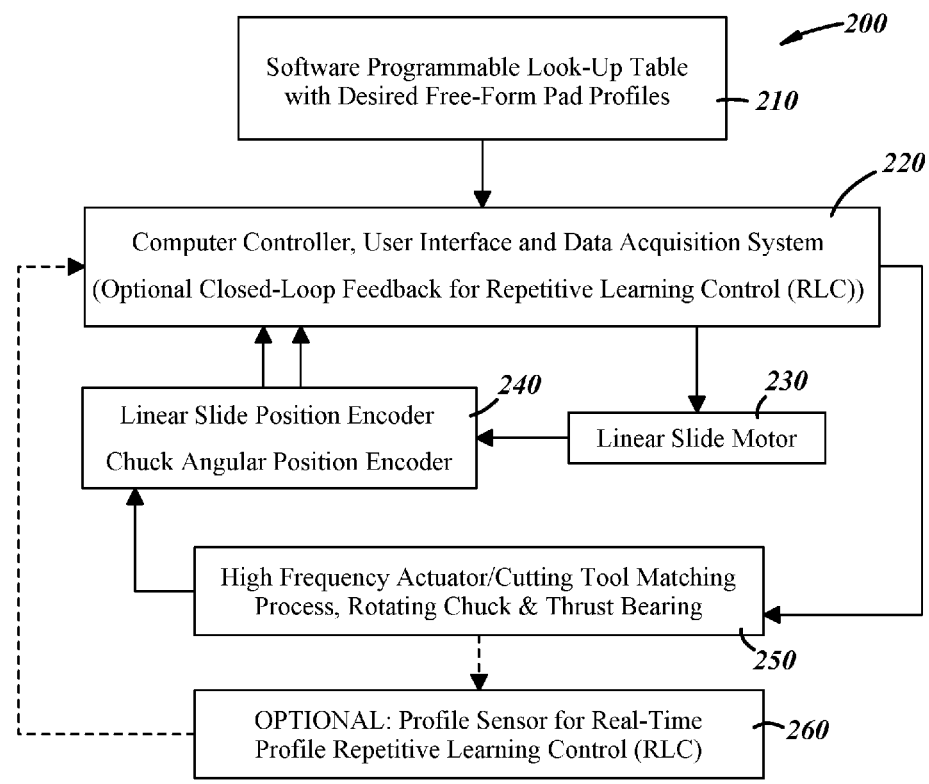
FIG. 22 depicts a flow chart for utilizing an inventive process.

A representative flow diagram 200 for control of the profiling machine, and providing appropriate position signals is shown in FIG. 22. The flow diagram starts with a programmable look-up table 210 with desired free-form pad profiles. This provides data and instructions to the computer controller 220, which has a user interface and data acquisition system. This step optimally could be closed-loop feedback for repetitive learning control (RLC). The controller 220 provides input to the linear slide motor 230 to move which in turn provides generated signals to the linear slide position encoder. This data signal is then fed to the computer controller 220.

At the same time, the computer controller 220 is providing signals to the high frequency actuator 250, which also controls the cutting tool machining process, rotating chuck and thrust bearing. The chuck angular position encoder 240 sends position signals to the computer controller 220.

As an alternative, a profile sensor real-time profile repetitive learning control (RLC) 260 could be utilized.

It is also known that thrust pad faces and profiles can slightly deform profiles under the loads imposed on them during operation of the turbocharger or turbomachinery. This can be taken into account during the formation of the thrust pad faces. With the present invention, this factor can be taken into account in the computer program which is fed to the computer controller 220. Thus, the final profiles on the thrust pads can be optimized for the actual use during operation for which the thrust bearings are designed.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A fluid-film thrust bearing for a turbocharger having a housing, a compressor wheel, a turbine wheel and a rotating elongated shaft member, said thrust bearing comprising:
    a disc shaped body member having a first substantially planar surface on one side and a second substantially planar surface on the opposite side from said first surface;
    each of said first and second surfaces oriented to face axially in the longitudinal direction of a turbocharger shaft member;
    said first surface having a plurality of thrust pad members thereon, each of said thrust pad members having an outer axial oriented surface thereon;
    each of said axially oriented outer surfaces having a curved profile configuration on at least a portion thereof;
    said curved profile configurations being defined by a non-linear equation; and
    a plurality of thrust pad members on said second surface; wherein said thrust pad members on said second surface each have an outer surface having a free-form configuration.

2. The fluid-film thrust bearing as set forth in claim 1 further comprising a central opening in said disc member, wherein said disc member can be positioned on a shaft member, and wherein said thrust pad members have a wedge-shaped configuration.

* * * * *